2,805,141

Patented Sept. 3, 1957

2,805,141

PELLETIZING PROCESS

Wayne E. Apuli, Babbitt, Minn., assignor to The Regents of the University of Minnesota, Minneapolis, Minn., a corporation of Minnesota No Drawing. Application May 24, 1954,
Serial No. 432,063

14 Claims. (Cl. 75—3)

This invention relates to pelletizing ores and other pulverant materials, particularly iron ore. In the beneficiation of some ores, such as taconite, specularite and the like, it is necessary to reduce the ore as it occurs in nature to a fine powder, so as to release the ore particles from the particles of silica and other gangue-like constituents. After being reduced, the fine particles of ore are separated from the silica and gangue by processes well known in the art and the resulting beneficiated ore contains a much higher percentage of iron than as found in nature. The division of the ore into fine particles, though necessary for the beneficiation or concentrating steps, may be a distinct disadvantage, insofar as the use of the product is concerned, for the fine ore particles are not suitable for use in blast furnaces of usual construction. For normal blast furnace use the ore should be in relatively larger particles, such as one-eighth to one inch, or even larger, so as to be capable of packing loosely to allow the furnace blast to pass upwardly therethrough during the smelting operation.

It is possible by known procedures to produce balls of ore of sufficient wet strength to permit a limited amount of handling. Thus, the finely divided ore may be introduced with eight percent to twelve percent of water into a revolving tube set at a slight gradiant. The particles of ore rolling upon themselves agglomerate into spherical masses ranging in size from one-eighth inch up to one inch, or even larger. By suitable control of the moisture, speed of rotation of the mill and other factors, the production of spherical or nearly spherical balls or compacts may be accomplished at relatively low cost. These compacts, however, are not suitable for shipping or for use directly in the blast furnace because, though strong enough to stand some handling, they are relatively friable when they dry out. It is known that when such spherical compacts of ore particles are heated to a temperature just below the melting temperature of the ore, the particles will frit together and form hard, very strong pellets capable of shipment, storage and handling and sufficiently strong for use in a blast furnace. To accomplish this, the temperature to which the balls are heated must be closely controlled.

Originally, the "green" or unfired ore compacts were fired, to form pellets capable of withstanding handling in use, in a combustion chamber furnace. In such a furnace, fuel is burned in external combustion chambers and the hot furnace gases are blown through the pelletizing chamber. Although good strong pellets were formed in the combustion chamber type furnace, it was envisaged that a more economical operation could be achieved from the use of an internal combustion type pelletizing furnace, in which the heat is developed within the pellets.

The reaction $4Fe_3O_4 + O_2 \rightarrow 6Fe_2O_3$ is exothermic. Under proper conditions, if air is passed through the ore, combustion, once started, will continue until the magnetite is all changed to hematite. Theoretically this conversion can be carried on continuously, the only energy required being the power necessary to operate a fan to draw air through the ore. The compacts as formed contain about thirty percent porosities, enabling gases to readily pass through them. Where the ore is not dry, as in the case of normal green ore compacts which contain between about eight to twelve percent by weight of moisture, the addition of a small amount of combustible material is necessary in order to maintain combustion. Initially, the fuel required to supplement the heat produced by the oxidation of magnetite was added as natural gas mixed with the air entering the bottom of the furnace. After many trials, it was found possible to operate a pelletizing furnace on magnetite compacts and natural gas, but it was found that operations were less expensive if coal or other solid combustible material was mixed with the taconite concentrate at the time the balls were formed. If sufficient coal was added to the ore compacts, no natural gas or other fuel was necessary. Hematite ores could be pelletized by the same method but, because no exothermic oxidation of the ore took place, about twice as much solid fuel was added as when pelletizing magnetic taconite concentrate.

Because heat requirements for pelletizing vary with different ores, it has been difficult to regulate the necessary amount of fuel to be admixed with the ore and dispersed through the compact. For this reason, it has been the custom to add an average minimum amount of solid fuel admixed with the ore before balling and adjust the heat requirements in the furnace by supplementing the solid fuel with an easily regulatable source of oil or gaseous fuel.

It has now been found that, as an improvement over this process, solid combustible material may be used as the pelletizing fuel, and that the amount of solid fuel present may be easily regulated by applying most or all of the solid fuel as a surface layer on the outside of the ore compacts just previous to their being fed to the furnace. According to this invention, the ore, containing moisture to the order of about eight to twelve percent is formed into compacts by balling, as for example, by the method disclosed in U. S. Patent No. 2,411,873, issued on December 3, 1946, to C. V. Firth. The damp balls as they come from the balling drum are screened and are then passed through a second balling mill into which a small quantity of fine solid fuel is continuously introduced. As the wet ore compacts tumble and rotate in contact with the solid fuel, with the sides of the drum and with other balls, they become uniformly coated over their entire outside surfaces with a thin layer of fuel. The compacts bearing the surface coating of solid fuel are then fed directly into the pelletizing furnace.

Because the fuel is thus added to the ore compacts just before they are fed into the furnace, the furnace operator has immediate control over the fuel in the compacts and can make rapid adjustments in fuel content. This change in fuel content of the compacts is reflected almost immediately in the changed burning conditions in the firing zone of the furnace. When part or all of the igniting fuel is on the outside of the compacts as a surface coating, the balls heat up more rapidly. This faster burning permits movement of a larger volume of ore through the furnace per unit of time and results in a substantial increase in the capacity of the furnace.

When all or most of the solid fuel is on the outside of the ore compacts, the danger is avoided of getting the pellets too hot on the inside and not hot enough on the outside. In this manner, possible fusion of the cores of the burned pellets is avoided. In making iron ore pellets for blast furnaces, it is desired to make a minimum of ferrous iron (FeO) which is more difficult to reduce in the blast furnace. As a result of rolling, the solid fuel on the outside of the wet ore compacts over-heating in the pelletizing furnace is avoided and ferrous iron in the burned pellets is minimized.

Where the ore compacts are to be burned on a grate-type furnace employing an igniter, the presence of solid fuel on the surface makes the solid fuel more readily available for quick ignition, resulting in the use of lesser amounts of gas or oil ignition fuel.

The principal object of this invention is to provide an improved method of heating ore compacts involving the combustion of a mixture of ore and fuel in an oxidizing atmosphere in which at least part of the fuel is present as a solid carbonaceous fuel substantially uniformly distributed over the outside surfaces of the ore compacts as a coating.

A further object of this invention is to provide an improved method of pelletizing iron ore by heating ore compacts in an oxidizing atmosphere in which at least part of the fuel present is in the form of a surface coating of coal substantially uniformly distributed over the outside surfaces of the ore compacts.

It is another object of this invention to provide a method of pelletizing iron ore, in which at least part of the fuel is present as a surface coating, adapted to be carried out in either an up-draft or a down-draft internal combustion furnace of the shaft or movable or stationary grate types, as continuous or batch-type processes.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated, this invention comprises the method of producing ore agglomerates in which substantially spheroidal green compacts of finely divided ore and solid carbonaceous fuel are formed, at least part of the solid fuel being substantially uniformly distributed over the outer surfaces of the compacts as a coating, and subjecting the thusly formed compacts in sequence to a pre-heating state, a firing stage and a cooling stage. In the preheating state, the ore compacts are subjected to a flow of heated gaseous combustion products which drive off the moisture in the compacts and heat the compacts to a temperature approaching incandescence. In the firing stage, the preheated compacts are brought to a temperature of incandescence below the temperature of fusion of the ore by the combustion of the fuel on and in the ore compacts, causing a bonding together of the ore particles in the compacts. The resulting pellets are subjected to a cooling stage in which they are cooled, preferably by flowing the oxidizing gas for the combustion zone through the mass of hot pellets to preheat it.

This invention may be practised in a shaft-type furnace such as is described and illustrated in the copending application of Edward W. Davis, Serial No. 202,326, filed December 22, 1950, issued as Patent No. 2,696,432 on December 7, 1954, a moving grate type furnace, such as the Dwight-Lloyd sintering apparatus, or such as that described and illustrated in the copending application of Edward W. Davis, Serial No. 335,539, filed February 6, 1953, or on stationary grate equipment of the Greenwalt type. The pelletizing process may be carried out as a continuous or batch-type operation, depending upon the type of equipment employed. The agglomeration of ore particles may take place as a result of the burning zone moving either upwardly or downwardly through a mass of ore compacts, or as a result of the burning zone remaining stationary and having a mass of ore compacts flowing past it.

According to the present invention, substantially spheroidal ore compacts may be made from moistened finely divided ore particles in any desired manner by known methods (such as the aforementioned Firth Patent No. 2,411,873) which, per se, form no part of the present invention. As will be described in greater detail, in some instances, a small amount of finely divided solid fuel is mixed with the ore prior to the formation of the compacts and is uniformly distributed throughout the porous compacts where it burns at the temperature attained in the process and forms one of the sources of available heat supply. The resulting moist ore compacts or balls, after grading for size, are provided with a surface coating of finely divided solid fuel. This coating of the ore compacts is preferably accomplished by rolling or tumbling the moist balls in a tube or drum into which a small amount of finely divided solid fuel has been introduced.

As a result of repeated rolling contacts between the moist outer surfaces of the balls with the walls of the drum or tube and with other balls, they quickly become coated with a thin substantially uniform layer of the solid fuel. Where no binder is included with the finely divided fuel, the limited moisture content of the compacts, substantially limits the thickness of the solid fuel to a thin layer. Thus, fuel content on the exterior of the moist compacts is determined at least in part by the size of the balls and the nature of the fuel particles. No binder other than additional water is needed to coat compacts up to about 6 percent coal limit. No extra binder or water is needed at 2½ percent coal or less. Satisfactory coatings have also been obtained by simply sprinkling powdered coal on the wet balls on the conveyor belt as they pass from the balling drum to the furnace feeders. The rolling and tumbling of the balls as they transfer from one belt to another is often sufficient to form the surface coating and provide proper distribution of the fuel.

The solid fuel is carbonaceous and may be anthracite or bituminous coals, pulverized sub-bituminous coals, coke, breeze, lignite or lignite char or the like, all in finely divided form. The bulk of the solid fuel should be less than 24 mesh and should preferably be less than about 35 mesh. The presence of larger fuel particles at this stage is undesirable because mixed sizes do not produce a layer of uniform thickness on the surface of the balls and because the larger particles do not adhere properly without a binder. A form of fine anthracite known as "flotation coal," a waste product from coal washing operations, is a preferred material for use in coating ore pellets with solid carbonaceous fuel. The micaceous structure of this anthracite enables it to form a thin uniform adherent coating of fuel on the compacts without necessitating the use of a binder. Where a thicker or a more adherent coating of fuel is required, small amounts of a binder may be included with the fuel. Materials which may be used for this purpose are well known and include, but are by no means limited to, substances such as bentonite, starch, various clays and the like. In one typical example including a binder, bentonite was admixed with the pulverized coal in the amount of twenty pounds of bentonite per ton of coal. It is often advisable to admix a binder with the fuel to prevent particles of the fuel from dislodging from the surfaces of the compacts and escaping from the furnace with the gases.

Up to about three percent of carbon is added to the ore as solid fuel when the ore is magnetite, and up to twice this amount is added when the ore is hematite. These figures are expressed as percentages by weight of carbon. The amount of finely divided combustible material that is added depends, of course, on the carbon content of the fuel. At least about fifty percent or more of the fuel is added on the outside of the ore compacts as a surface coating.

As examples of the use of surface fuel coatings, the following may be stated:

When pelletizing magnetic taconite concentrate on a down draft traveling grate machine using a twelve-inch bed and firing pellets between three-quarters and three-eighths inch in size, about fifty pounds of flotation anthracite coal were used per dry gross ton of ore, fifteen pounds being mixed with the ore before balling and thirty-five pounds being rolled on the surface of the balls just before they were fed to the pelletizing machine.

When pelletizing the same material on an up draft traveling grate machine using a twenty-four inch bed and firing pellets between one-half and one-quarter inch in size, about forty-five pounds of flotation anthracite coal were used per dry gross ton of ore, ten pounds being mixed with the ore before balling, thirty pounds being rolled on the surface of the regular balls and the remainder being rolled on the surface of about a one-inch layer of balls used as an ignition layer.

When pelletizing the same material on an up draft batch type pelletizing furnace using a twenty-four inch bed and firing pellets between one-half and one-sixteenth inch in size, about thirty-five pounds of flotation anthracite were used per gross ton of ore, all of it being rolled on the outside of the balls.

When pelletizing specular hematite on an up draft grate machine using a twenty-four inch bed and firing pellets between five-eighths and three-eighths inch in size, eighty-five pounds of flotation anthracite mixed with eight pounds of bentonite were rolled on the outside of the balls. No fuel was used inside the balls.

For use in grate furnaces, where ignition layers of higher fuel content are normally employed, up to four or five percent carbon, or in some instances, up to twenty percent carbon, may be applied to the outer surfaces of the ore compacts. To produce surface coatings of sufficient thickness to contain these higher quantities of solid fuel usually requires the addition of a binder to the fuel.

Immediately after application of the surface coating of fuel, the coated ore compacts are passed to a previously ignited pelletizing furnace. As pointed out heretofore, this furnace may be of any of the types conventionally used to agglomerate ores. In each instance, the furnace is comprised of three zones, for preheating the ore compacts, firing the compacts, and cooling the compacts. For most efficient operation, the compacts are preferably preheated by contact with escaping gaseous combustion products from the burning zone, and the fired pellets are cooled by passing in heat exchange relation with the oxidizing gases for the burning zone.

In the preheating zone, the temperature of the green compacts is gradually raised to the temperature of incandescence by the heated gaseous products of combustion which proceeds in the process. This is accomplished by a forced draft upwardly or downwardly through the burning zone as is appropriate for the particular furnace used. As the temperature of the ore compacts rises, the preheating zone becomes merged with the burning zone. At about the temperature of incandescence, the solid fuel particles on the surface and mixed in the ore compacts in contact with the preheated oxidizing gas ignite, rapidly raising the temperature of the compacts to a controlled temperature slightly, but distinctly, below that of fusion. Depending upon the ore used, this temperature may be in the range between about 1800° F. and 2500° F. For magnetic taconite this temperature is normally about 2350° F. At temperatures, slightly below the fusion point, the individual ore particles become bonded together into tough, strong, hard pellets capable of withstanding handling and shipping to the blast furnaces. Although the temperature of the ore compacts never reaches the temperature of fusion, at the instant of ignition of the individual finely divided particles of solid fuel the temperature of the gases being forced around and through the compacts rapidly rises momentarily to permit partial softening of the contact points between the individual ore particles, causing them to bond together.

The thus formed pellets are then cooled preferably by passing in heat exchanging contact with the incoming oxygen-containing gas to the burning zone. Where desired for additional temperature control and to balance the heat requirements of the furnace, the oxygen-containing gas may contain a minor percentage of combustible gases in an amount insufficient to support or propagate flame, although the almost immediate control afforded the operator by the regulation of solid fuel rolled upon the outside of the balls for most purposes makes the addition of combustible gas unnecessary. The cooled pellets are discharged by any suitable means for handling to a shipping or storage point.

It has been found that for satisfactory pelletizing of most iron ores by use of this process, that the total heat required is about 800,000 B. t. u. per ton of ore for hematite in a shaft furnace, and that about 30,000 cubic feet of air are required to cool the compacts in the cooling zone and provide oxygen necessary for combustion of the combustible constituents in the burning zone of the process. A million or more B. t. u. are required to pelletize a ton of hematite in a grate type furnace, depending upon the efficiency of the particular furnace, due to greater loss of heat by radiation and the necessity of using a continuous ignition flame. By way of comparison, other agglomeration processes, sintering and nodulizing processes, require between two and three million B. t. u. per ton, and about 300,000 cubic feet of air for cooling.

The 800,000 B. t. u. per ton base figure is approximately the amount of fuel needed if the ore being pelletized is hematite. With other ores, the amount of heat required may be more or less, because at the temperature required for hardening the compacts, certain heat-consuming and heat-producing reactions sometimes occur. For example, if the ore is magnetite, it is largely oxidized to hematite in the furnace. Since this is a heat-producing reaction, less heat input from fuel sources is required. In the oxidation of a ton of magnetite to hematite, about 300,000 B. t. u. of heat are liberated, thus reducing the required heat input to about 500,000 B. t. u. in a shaft furnace. If the ore being treated contains both magnetite and sulfur, both of which are heat-producing when oxidized, the heat input required may be still further reduced. On the other hand, limestone sometimes associated with the ore, is heat absorbing and necessitates additional heat input. Such substances as lime, almina or silica may be added to the ore in some cases, for the purpose of adjusting the composition of the ore to make it more suitable for smelting. For example, if limestone is added to the ore, it is in the form of calcium carbonate, and during agglomeration it is converted to calcium oxide, a rection requiring heat.

For purposes of calculation, it is therefore only ncessary to add the B. t. u. from the heat-consuming reactions to about 800,000 B. t. u. in the case of the shaft type furnace (or about 1 to 1¼ million B. t. u. in the case of a grate furnace) and substract therefrom the B. t. u. in the heat-producing reactions in order to determine the heat input required.

Where the ore contains no heat-producing substances, or where it contains heat-absorbing constituents, it is necessary, in order to obtain uniform heating of the insides of the compacts, that a greater proportion of the fuel be admixed with the finely divided ore before the balls are formed, and thus be uniformly distributed through the interiors of the balls. In forming pellets from hematite ores, for example, it may be desirable that as much as one-half of the added solid fuel be incorporated in the ore before forming the compacts, and that the remainder be applied as a surface coating. In forming pellets from high grade magnetite concentrate, on the other hand, where the ore compacts contain a high percentage of heat-producing reactants, it may often suffice if little or no solid fuel is incorporated in the ore compacts, but all of it may be applied on the surface as a coating.

The invention is further illustrated by the following examples:

*Example I*

The pelletizing process of this invention was carried out as follows, using a hematite ore. The ore used in this example was one in which the iron is present largely in the form of the mineral specularite. The ore concentrate was wet ground to an average particle size of about 325 mesh and filtered. The moisture content was removed by filtration. The filter cake contained a moisture content of about 9.5 percent, which is acceptable for satisfactory rolling of specularite concentrate in a balling drum. Before being fed to the balling drum, pulverized limestone was added to the concentrate at the rate of forty-nine pounds per ton. Bentonite was also added in the amount of fifteen pounds per ton. As the spherical balls rolled from the balling drum, they were screened for size. Small balls were returned to the drum and the balls of the desired size discharged as screen oversize onto a conveyor belt which transported them to a rerolling drum. Pulverized anthracite coal containing 2.5 percent by weight of bentonite was fed at a controlled rate onto the ribbon of balls on the belt, so as to add 3.67 percent by weight of coal to the ore compacts. Bentonite amounting to 2.5 percent of the weight of the coal was added with the coal. The rolling action of the rerolling drum served to distribute this coal as an even coating of fine coal over the surface of each of the balls. The fuel-coated balls were then charged directly into an updraft furnace of the moving grate type onto an ignited hearth layer of previously burned pellets and coke heated to high temperature by a gas burner.

The balls were fed to the furnace to an average depth of eleven-and-one-fourth inches in two courses of six-and-one-half and four-and-three-fourths inches respectively. The burner chamber temperature was maintained at about 1025° C. (1877° F.). Complete combustion was observed both vertically and horizontally, with no appreciable amount of fusion. A good yield was obtained of hard strong pellets. Total heat consumption was about 1,500,000 B. t. u. per ton of concentrate.

*Examples II to IV*

A number of tests were carried out forming pellets from finely ground magnetite concentrate. The concentrate assayed about sixty-four percent iron. Six pounds of bentonite per ton of concentrate was added. The ore was formed into spherical compacts in a Firth balling drum. The compacts contained about ten percent moisture. The compacts were rerolled to provide a surface coating of coal. The compacts comprising the ignition layer and containing a higher solid fuel content were rerolled separately. The thus coated balls were then charged to a moving grate furnace, such as that described in co-pending application Serial No. 335,539. The grate had a hearth layer of previously burned pellets. Upon this layer was disposed an ignition layer of green compacts having a higher solid fuel content, and the deep main layer of green compacts containing lesser amounts of solid fuel was charged on top of the ignition layer. To minimize radiation losses from the sides of the furnace, side walls of previously burned pellets were disposed along the grate and a top cover layer of previously burned pellets were used. The ignition layer was ignited with a gas burner. The pertinent data are summarized in the table below:

| Example No. | II | III | IV |
|---|---|---|---|
| Ignition layer: percent by weight coal applied by rolling | 4.54 | 4.24 | 4.2 |
| Main layer: | | | |
| percent by weight coal applied by rolling | [1] 1.17 | 0.93 | 1.2 |
| percent coal mixed with ore | | 0.67 | |
| Heat per ton concentrate, B. t. u. per ton | 739 | 857 | 645 |

[1] In Example II, the solid fuel coating was not applied in a rolling drum, but fine anthracite was merely sprinkled on top of the ribbon of balls on the conveyor belt following the ball screen. The tumbling and rolling of the balls on the conveyor and feeder belts distributed the coal satisfactorily.

*Example V*

In a full scale plant operation using magnetite ore from taconite compacts were prepared in a balling drum. Eleven pounds per ton (one-half percent) of finely divided coal was admixed with the ore concentrate before balling and an additional twenty-two pounds of coal per ton of ore (one percent) was added as a surface coating by rerolling. The coated balls were charged to the top of an updraft shaft furnace. Total fuel consumption amounted to about 800,000 B. t. u. per ton of concentrate. Of this amount, about 500,000 B. t. u. were derived from the added solid fuel, with the remainder coming from oxidation of magnetite to hematite. There was little or no apparent fusion.

As many apparently widely different embodiments of this invention may be made without departing from the spirit and scope thereof, it is to be understood that I do not limit myself to the specific embodiments herein.

I claim as my invention:

1. In the method of producing ore pellets which comprises forming green compacts of moist finely divided ore, preheating said green compacts, firing to raise the temperature of said compacts to a temperature of incandescence, but below that of fusion of the compacts to bond the ore particles together, and then cooling, the improvement which resides in supplying solid carbonaceous fuel to assist in the firing of said compacts as a coating on the outer surfaces of said compacts after the green compacts are formed and before pre-heating.

2. In the method of producing ore pellets which comprises forming substantially spheroidal green compacts of moist finely divided ore, preheating said green compacts to drive off the moisture, firing said compacts to raise the temperature to a temperature of incandescence, but below that of fusion of the compacts to bond the ore particles together forming hard strong pellets, and then cooling, the improvement which resides in supplying fuel to assist in the firing of said compacts as a substantially uniform coating of finely divided solid carbonaceous fuel on the outer surfaces of said compacts after the green compacts are formed and before pre-heating.

3. In the method of producing ore pellets which comprises forming substantially spheroidal green compacts of moist finely divided ore, preheating said green compacts to drive off the moisture and dry the compacts, firing said components with solid carbonaceous fuel to raise the temperature of the ore compacts to a temperature of incandescence, but below that of fusion of the compacts to bond the ore particles together forming hard strong pellets, and then cooling, the improvement which resides in supplying at least part of the solid carbonaceous fuel to assist in the firing of said compacts as a substantially uniform coating of solid carbonaceous fuel on the outer surfaces of said compacts applied to the green compacts before preheating.

4. The method according to claim 3 further characterized in that part of the solid carbonaceous fuel is admixed with the finely divided ore prior to forming the compacts.

5. The method according to claim 3 further characterized in that the ore is iron ore and the solid carbonaceous fuel is anthracite coal.

6. The method according to claim 3 further characterized in that the solid carbonaceous fuel is present in a small amount up to about six percent by weight of carbon.

7. The method of producing ore pellets which comprises forming green compacts of moist finely divided ore, applying a coating of solid carbonaceous fuel on the outer surfaces of said compacts, preheating said coated compacts, firing said compacts to raise the temperature of the compacts to a temperature of incandescence, but below that of fusion of the compacts to bond the ore particles together, and then cooling.

8. The method of producing ore pellets which comprises forming substantially spheroidal green compacts of moist finely divided ore, applying a substantially uniform coating of finely divided solid carbonaceous fuel on the outer surfaces of said compacts to assist in firing, preheating said coated green compacts to drive off the moisture, firing said compacts to raise the temperature to a temperature of incandescence, but below that of fusion of the compacts to bond the ore particles together forming hard strong pellets, and then cooling.

9. The method according to claim 8 further characterized in that the fuel coating is applied by rolling the fuel onto the moist ore compacts.

10. The method of producing ore pellets which comprises forming substantially spheroidal green compacts of moist finely divided ore and finely divided solid carbonaceous fuel, applying additional solid carbonaceous fuel as a thin substantially uniform coating on the outer surfaces of said compacts to assist in firing, preheating said coated green compacts to drive off the moisture, firing said compacts to raise the temperature to a temperature of incandescence, but below that of fusion of the compacts to bond the ore particles together forming hard strong pellets, and then cooling.

11. The method according to claim 10 further characterized in that the fuel coating is applied by rolling the fuel onto the moist ore compacts.

12. The method according to claim 10 further characterized in that the ore is iron ore and the solid carbonaceous fuel is anthracite coal.

13. The method according to claim 10 further characterized in that the solid carbonaceous fuel is present in a small amount up to about six percent by weight of carbon, and at least one-half of the fuel is present in the surface coating.

14. The method according to claim 10 further characterized in that a binder is included with the solid carbonaceous fuel.

References Cited in the file of this patent

UNITED STATES PATENTS

| | | |
|---|---|---|
| 1,278,166 | Kilbourn | Sept. 10, 1918 |
| 1,341,890 | Eustis | June 1, 1920 |
| 1,508,101 | Holmberg | Sept. 9, 1924 |
| 2,052,329 | Wendeborn | Aug. 25, 1936 |
| 2,191,911 | Greenwalt | Feb. 27, 1940 |
| 2,506,618 | Sainderichin | May 9, 1950 |
| 2,533,142 | Royster | Dec. 5, 1950 |
| 2,544,752 | Gelbman | Mar. 13, 1951 |
| 2,676,095 | DeVaney et al. | Apr. 20, 1954 |
| 2,750,273 | Lellep | June 12, 1956 |

OTHER REFERENCES

Chemical Abstracts, vol. 32, November 10, 1938, pages 8311–8312.

The Iron Age, March 2, 1944, pages 46–49.

Journal of Metals, vol 1, No. 11, November 1949, pages 834–837.

UNITED STATES PATENT OFFICE

CERTIFICATE OF CORRECTION

Patent No. 2,805,141 September 3, 1957

Wayne E. Apuli

It is hereby certified that error appears in the printed specification of the above numbered patent requiring correction and that the said Letters Patent should read as corrected below.

Column 6, line 55, for "almina" read -- alumina --; column 8, in the table, first column thereof, last line, for "B.t.u. per ton" read -- M B.t.u. per ton --.

Signed and sealed this 12th day of November 1957.

(SEAL)
Attest:

KARL H. AXLINE
Attesting Officer

ROBERT C. WATSON
Commissioner of Patents